United States Patent [19]

Lawrence

[11] 4,057,652

[45] Nov. 8, 1977

[54] FREEZE PARTICLE PROCESS

[75] Inventor: Benjamin Lawrence, Springfield Township, Hamilton County, Ohio

[73] Assignee: The Procter & Gamble Company, Cincinnati, Ohio

[21] Appl. No.: 729,565

[22] Filed: Oct. 4, 1976

[51] Int. Cl.² ............................ A23F 1/08; A23F 3/00
[52] U.S. Cl. .................................... 426/388; 426/386; 426/594
[58] Field of Search ................ 426/388, 386, 387, 594

[56] References Cited

U.S. PATENT DOCUMENTS

| | | | |
|---|---|---|---|
| 3,419,399 | 12/1968 | Earle et al. | 426/388 |
| 3,565,635 | 2/1971 | Mahlmann | 426/594 X |
| 3,689,278 | 9/1972 | Carbonell | 426/388 X |
| 3,769,032 | 10/1973 | Lubsen et al. | 426/388 X |
| 3,821,447 | 6/1974 | Jasovsky et al. | 426/386 |
| 3,939,291 | 2/1976 | Katz | 426/386 X |
| 3,997,685 | 12/1976 | Strobel | 426/594 |
| 4,007,291 | 2/1977 | Siedlecki et al. | 426/386 X |

*Primary Examiner*—Joseph M. Golian
*Attorney, Agent, or Firm*—Ronald L. Hofer

[57] ABSTRACT

An instant beverage is made by forming a mixture of an aromatic food condensate and at least about 10% of beverage solubles, freezing and then grinding the mixture to form frozen particles. The frozen particles are mixed with additional cold, dry beverage solubles to form a mixture comprising from about 0.2% to about 15% of frozen particles. This mixture is then warmed to melt the frozen particles and incorporate the aroma and flavor of the condensate in a stable form into the beverage solubles.

6 Claims, No Drawings

FREEZE PARTICLE PROCESS

FIELD OF THE INVENTION

This invention relates to a process for making an instant or soluble beverage product having excellent aroma and flavor. The invention relates, in particular, to instant or soluble coffee.

THE PRIOR ART

The present invention is particularly concerned with the manufacture of instant coffee. The manufacture of instant or soluble coffee involves extracting water solubles from roasted and ground coffee beans and then spray-drying or freeze-drying the water extract to obtain dry powder which can be combined with water to form an instant beverage. The dry coffee extracts thus produced are without the aroma and flavor of freshly roasted coffee, although techniques can be employed to improve the aroma and flavor of the instant coffee. Many known techniques for improving the aroma and flavor of instant coffee involve, in general, stripping coffee volatiles from moistened roast and ground coffee prior to extracting water solubles therefrom, condensing these volatiles and adding them to dry instant coffee powder which is made from the extracted water solubles.

The aroma constituents may be added to the coffee powder in combination with a carrier such as coffee oil such as is taught in U.S. Pat. No. 3,535,118, Oct. 20, 1970, to Klein et al. The Klein et al. patent teaches a process in which carbon dioxide is separated from coffee aroma constituents prior to adsorbing the aroma constituents into coffee oil which is on or subsequently added to coffee powder.

While the coffee aromatic or volatile flavor fraction can be concentrated and added to coffee solubles in liquid form, it is also known to combine frozen aromatized soluble coffee extract with soluble coffee powder. See, e.g. U.S. Pat. No. 3,419,399, Dec. 31, 1968, to Earle et al., which teaches a process for forming a soluble coffee dough. Also, see U.S. Pat. No. 3,565,635, Feb. 23, 1971, to Mahlmann which teaches a process involving coating frozen particles of coffee extract with a soluble coffee powder and then drying the coated particles, preferably by freeze-drying.

However, while various methods for improving soluble coffee are disclosed in the art, there remains a need for improved processes which economically provide stable instant or soluble coffee having an aroma and flavor similar to that of coffee made directly from roast and ground coffee beans. It is one object of this invention to provide a soluble coffee having an aroma and flavor of excellent character. It is an additional object of this invention to provide a practical and economical process for making instant coffee. Yet another object of this invention is to provide an aromatized instant coffee product which has excellent aroma and flavor stability.

SUMMARY OF THE INVENTION

It has been discovered that a flavor-stable instant beverage product can be made by a process which involves freezing a mixture of a flavorful aromatic beverage condensate and dry solubles and then grinding the frozen mixture to form particles which can be added to cold instant beverage powder and warmed to aromatize the instant beverage powder. A product made in accordance with this invention has a stable flavor. On the other hand, if the flavorful aromatic fraction is frozen without the presence of dry solubles and added to cold instant beverage powder followed by warming to aromatize the powder, the flavor of the product will deteriorate quickly with time. Thus, in accordance with the process of the present invention a dry instant beverage product is made by the steps of:

A. forming a first mixture comprising from about 15% to about 80% of an aromatic beverage condensate and from about 20% to about 85% of dry beverage solubles;
B. freezing said first mixture of step (A);
C. grinding the frozen first mixture of step (B) thereby forming frozen particles; and
D. forming a second mixture comprising from about 0.2% to about 15% of the particles of step (C) and from about 85% to about 99.8% of dry beverage solubles chilled to a temperature of less than about 10° F; and
E. warming said second mixture of step (D) thereby melting the frozen particles and imparting aroma and flavor to the mixture.

The process of this invention is applicable to provide instant beverage products in general, e.g., instant tea, but is particularly useful to provide instant coffee.

DESCRIPTION OF THE INVENTION

In accordance with the present invention, a dry instant beverage product is made by the steps of:

A. forming a first mixture comprising from about 15% to about 80% of an aromatic beverage condensate and from about 20% to about 85% of dry beverage solubles;
B. freezing said first mixture of step (A);
C. grinding the frozen first mixture of step (B) thereby forming frozen particles; and
D. forming a second mixture comprising from about 0.2% to about 15% of the particles of step (C) and from about 85% to about 99.8% of dry beverage solubles chilled to a temperature of less than abut 10° F; and
E. warming said second mixture of step (D) thereby melting the frozen particles and imparting aroma and flavor to the mixture.

While the process of this invention is applicable to provide products such as instant tea, instant orange juice, instant cocoa, and other instant beverage products, it is particularly useful to provide instant coffee. Thus, the following description of the invention will relate specifically to making an instant coffee product. However, those skilled in the art will recognize that the process of this invention is applicable to instant beverage products in general and would have no difficulty in the application of the process steps of this invention to, for example, the making of an instant tea product.

The process of the present invention may be applied to coffee in accordance with the following.

The aromatic beverage condensate of step (A) is obtained from roast and ground coffee. Typical roasting equipment and methods for roasting coffee beans are described, for example, in Sivetz and Foote, *Coffee Processing Technology*, Avi Publishing Company, Westport, Conn. 1963, Vol. I, at pages 203–226. Typical grinding equipment is described, for example, in Sivetz and Foote, supra, pages 239–250.

Suitable aromatic beverge condensates can be obtained by processes well known in the art. Examples of suitable aromtic coffee condensates are disclosed in U.S. Pat. Nos. 3,224,531, Apr. 5, 1966 to Clinton et al; 3,821,447, June 28, 1974 to Jasovsky et al.; and 3,717,472, Feb. 20, 1973 to Strobel. A volatile flavor fraction can be distilled from the roast and ground coffee by, for example, steam distillation of the roast and ground coffee, while the coffee is in a multi-column extraction train. A multi-column extraction train is composed of a number of elongated extraction columns connected in a series for continuous countercurrent operation. Steam distillation of the roast and ground coffee can be accomplished by passing steam through the coffee column containing fresh ground coffee for from about 10 to about 45 minutes. The distillation product or condensate can be liquefied by cooling to about, for example, 40° F, and in liquid form is suitable for use in the process of the present invention.

The beverage solubles of steps (A) and (D) may be obtained from roast and ground coffee in accordance with the following. After the distillatin operation is completed, the roast and ground coffee is extracted by admitting hot water, for example, water having a temperature of from 320° F to about 375° F, to the last column (i.e., column containing the most spent or extracted coffee) of the extraction train. The temperature of the water is allowed to decrease by natural head losses or by intercolumn heat exchangers as it passes through the system. The water extract is withdrawn from the column containing the freshest, that is, previously unextracted, roast and ground coffee at a temperature of from about 190° F to about 230° F. Typical disclosures of equipment and methods which can be used in the extraction operation can be found in Sivetz, supra, pages 261–378 and U.S. Pat. No. 2,515,730, July 18, 1950, to Ornfelt.

The aqueous coffee extract is then dried to obtain dry beverage solubles (containing less than about 5% water). The manner of drying is not critical and, for example, freeze-drying, vacuum-drying, drum-drying, or spray-drying processes can be used. If the resulting dried product is not in the form of particles, it can be broken up by a number of methods to form coffee particles which are more suitable for mixing with the aromatic beverage condensate in step (A) or the frozen particles in step (D). The preferred method for drying the aqueous extract is spray-drying wherein the liquid extract is sprayed into a tower and simultaneously contacted with a flow of hot air, conventionally from about 350° F to about 650° F. The dried coffee extract emerges from the bottom of the tower as porous spherical partices of coffee solubles containing, for example, from about 1.5% to about 5% by weight moisture. It is preferable to concentrate the coffee extract prior to the drying operation by convential concentration methods such as freeze-concentration, thin film evaporation, flashing under reduced pressure, or by the addition of previously dried instant coffee powder, that is, soluble coffee solids. It is preferable that the coffee extract be concentrated to at least about 45% by weight coffee solubles prior to the drying step. This concentration step facilitates drying of the extract and offers a beneficial flavor effect. Typical disclosures of spray-drying which can be used in accordance with the present invention are contained in Sivetz, supra, pages 382–513, and U.S. Pat. Nos. 2,771,343, Nov. 20, 1956, to Chase et al.; 2,750,998, June 19, 1956, to Moore; and 2,469,553, May 10, 1949, to Hall.

The coffee solubles for use in step (D) of this invention are preferably agglomerated in accordance with the process for agglomerating instant coffee taught in U.S. Pat. No. 3,615,669, Oct. 26, 1971, to Hair et al. As taught in this patent, dry coffee particles can be agglomerated by gently agitating the particles while spraying thereon a small amount of a highly concentrated solution of coffee solubles in water.

In accordance with steps (A) and (B) of the present invention, from about 15% to about 80% of a liquid aromatic condensate rich in coffee flavor and aroma is mixed with from about 20% to about 85% of dry coffee solubles and then frozen. In accordance with step (C) this frozen mixture is ground to form frozen particles which are sized to have a particle size of from about 12 mesh to about 50 mesh (U.S. Standard Sieve). Preferably, the particles will pass through a 40 mesh screen and not through a 50 mesh screen. The grinding step may be carried out, for example, by means of a hammer mill. Suitable hammer mills are commercially available.

In accordance with step (D) of the present invention, from about 0.2% to about 15% of the frozen particles of step (C) are combined with from about 85% to about 99.8% of cold, dry coffee solubles, preferably agglomerated coffee solubles. The coffee solubles should be at a temperature of less than 10° F when combined with the frozen particles. Further, the coffee solubles should have a moisture content of less than 5%. After the frozen particles are combined with the coffee solubles at the prescribed cold temperature, the mixture is allowed to warm to a temperature above the freezing temperature of the frozen particles, whereupon the frozen particles melt and the aroma and flavor materials are absorbed by the coffee solubles. Slowly warming the mixture will effect a more uniform distribution of the frozen particles into the coffee solubles. The resulting instant coffee product has excellent flavor and, importantly, excellent flavor stability.

The following example is intended to illustrate the present invention without acting as a limitation thereof.

EXAMPLE I

Roast and ground coffee beans are placed in a battery of eight extraction columns and subjected to steam distillation to strip volatile aromatics from the coffee beans (0.06 lbs. of steam at about 250° F are used per pound of coffee beans). The steam distillate, containing volatile aromatics, is then cooled and condensed to liquid form. Next, the roast and ground coffee beans are subjected to fresh water countercurrent extraction, under the following conditions: inlet water temperature 360° F and outlet water temperature 245° F, and 1.9 lbs. of extract are collected per pound of roast and ground coffee in the last column. The extract concentration is 22%. The extract is concentrated by rising falling film evaporation to 48% solids and then spray-dried at an air temperature of 400° F to form soluble coffee particles having a bulk density of 18 to 20 lbs./cu. ft. Next, 0.45 lbs. of these particles are dissolved in 0.55 lbs. of distillate to form a solution which is frozen in a stainless steel tray in a "cold room" held at a temperature of −40° F and ground in a "Fitzpatrick" hammer mill to particle sizes which will pass through a 35 mesh screen (U.S. standard).

Then, 0.26 lbs. of frozen particles are mixed with 10 lbs. of the spray-dried coffee extract made above, the spray-dried particles having a temperature of about −10° F. After mixing, the mixture is warmed slowly to 31° F (in 45 minutes) so that moisture and aromatics of the frozen distillate are absorbed uniformly into the spray dried extract. The mixture is then allowed to warm to room temperature.

The resulting soluble coffee has an excellent and stable aroma and flavor.

What is claimed is:

1. A process for making an instant beverage comprising the steps of:
   A. forming a first mixture comprising from about 15% to about 80% of an aromatic beverage condensate and from about 20% to about 85% of dry beverage solubles;
   B. freezing said first mixture of step (A);
   C. grinding the frozen first mixture of step (B) thereby forming frozen particles; and
   D. forming a second mixture comprising from about 0.2% to about 15% of the particles of step (C) and from about 85% to about 99.8% of dry beverage solubles chilled to a temperature of less than about 10° F; and
   E. warming said second mixture of step (D) thereby melting the frozen particles and imparting aroma and flavor to the mixture.

2. The process of claim 1 wherein the aromatic beverage condensate and dry beverage solubles are derived from roast and ground coffee.

3. The process of claim 1 wherein the dry beverage solubles are obtained by spray drying a beverage extract.

4. The process of claim 3 wherein the beverage extract is concentrated before spray drying.

5. The process of claim 1 wherein the particles of step (C) have a particle size of from about 12 mesh to about 50 mesh.

6. The process of claim 1 wherein the dry beverage solubles of step (D) contains less than 5% water.

* * * * *